Sept. 20, 1966 W. F. GESELL 3,273,378
GAGING DEVICE
Filed Nov. 29, 1963

INVENTOR.
WILLIAM F. GESELL
BY Ernest J. Hix
HIS ATTORNEY

United States Patent Office 3,273,378
Patented Sept. 20, 1966

3,273,378
GAGING DEVICE
William F. Gesell, Fairborn, Ohio, assignor to The Sheffield Corporation, Dayton, Ohio, a corporation of Delaware
Filed Nov. 29, 1963, Ser. No. 326,828
6 Claims. (Cl. 73—37.9)

This invention pertains to gages using a fluid as a gaging medium and more particularly to a gaging system of this type employing fluid control devices having no moving parts.

One object of this invention is the provision of a simple gaging device using gaging fluid control means having no moving parts and which is economical to fabricate and capable of versatile and efficient operation.

Another object of this invention is the provision of a gaging device of the character mentioned in which flow conditions of the fluid gaging medium are uniquely obtained for operation of signal or indicating means, such flow conditions being responsive to flow changes determined by a characteristic such as a dimension of a product gaged and of improved linearity.

Another object of this invention is the provision of such a gaging device wherein the indicating means includes a transparent flow tube having an internal taper and an indicating float movable therealong, wherein through the improvement in linearity of the flow conditions obtained such a tube can be utilized having a single internal taper or of minor development in taper while providing accurate and linear response of the indicating float with great precision, and wherein through simple external adjustment of the gaging circuit such a single tube is adaptable to a wide range of varying amplifications.

Another object of this invention is the provision of such a gaging device in which one or more signal means may be used individually or in cooperative association to provide an indication of product characteristics, such as for example, the indication of a workpiece dimension through response of an indicating float and the simultaneous actuation of electrical switches for workpiece segregation or marking.

Figure 2:
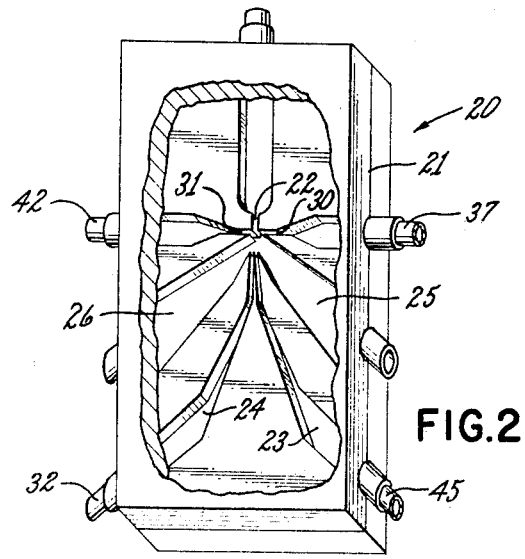
Figure 1:
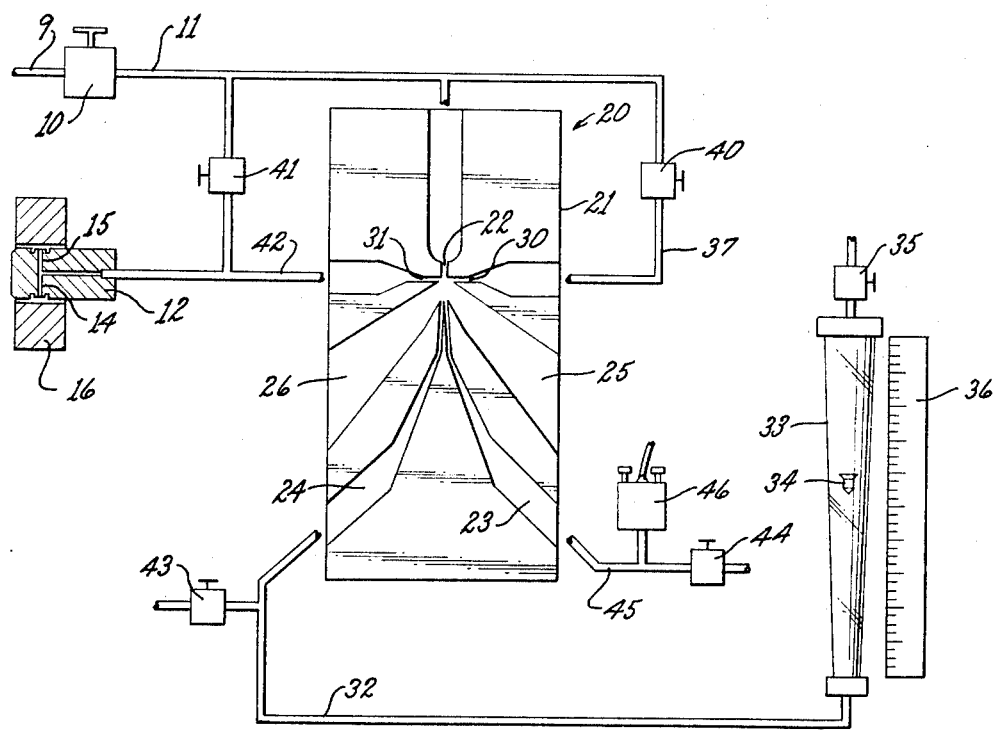

Other objects and advantages of the invention will be apparent from the following description, the appended claims, and the accompanying drawings, in which:

FIG. 1 is a schematic diagram illustrating the operative components of an exemplary embodiment of this invention, and FIG. 2 is a perspective view, with parts broken away, of a fluid control device forming a portion of the exemplary embodiment and shown schematically in FIG. 1.

While the invention may be readily used with both compressible and incompressible fluids it will now be described in an exemplary embodiment using air as the fluid gaging medium wherein a product characteristic such as the diameter of a workpiece is measured.

Fluid pressure supply means including air supply conduit 9, adjustable pressure regulator 10, and a supply line 11 provide flow as illustrated in FIG. 1. Gaging means, shown in the illustrated embodiment as spindle 12, is operatively connected to receive flow from supply line 11 through gaging passage means as shown. Spindle 12 has a pair of opposed orifices 14 and 15 therein through which gaging air flows as a function of the proximity of the orifices to a workpiece 16 which has a cylindrical hole therein the diameter of which is the product characteristic being measured in this example. Gaging spindle 12 is operatively connected to the unique fluid gaging device to be presently described.

A fluid device or amplifier 20 is uniquely employed in the operation of the gaging system or device in association with the other components thereof. Referring particularly to FIG. 2, amplifier 20 has a housing 21 with a number of passages, including a power jet 22, therein operatively connected to line 11 and the regulated supply of air from regulator 10. Flow from power jet 22 is normally received by first and second discharge passages illustrated at 23 and 24 respectively in housing 21 opposite power jet 22. Air flow from power jet 22 which is not normally received into passages 23 and 24 is dumped through another pair of passages 25 and 26 in housing 21 which communicate with the ambient atmosphere. First and second control jets 30 and 31 respectively are arranged in housing 21 opposing one another and directing air against and transverse to air flowing from power jet 22 for proportioned flow into discharge passages 23 and 24. The amount of air diverted into each passage 23 and 24 is thus determined by the relative energy of the control jets 30 and 31. The arrangement of power jet, control jets, and discharge passages makes possible the use of a realtively low energy stream such as the stream flowing through each control jet 30 and 31 to divert a comparatively high energy stream such as the stream flowing from power jet 22 into discharge passages 23 and 24 in any desired proportion. As previously mentioned this is accomplished by simply varying the energy of the control jets 30 and 31.

Passage means such as a line 37 connects control jet 30 to supply line 11, and an adjustable restrictor 40 installed in line 37 controls air flow to control jet 30. For any given application restrictor 40 may be fixed; however, it is desirable that it be adjustable for ease of establishing the correct size restrictor initially and to compensate for changes in linearity of the gaging signal. Such changes may be brought about by many factors such as wear in the tooling used in a given application and imperfections in the gaging components caused, for example, by manufacturing errors.

A restrictor 41 installed in the gaging passage means provides amplification adjustment for the gaging device by making it possible to change the basic level of flow in passage or line 42 to control jet 31. Line 42 to control jet 31 is connected to the gaging passage means downstream of restrictor 41 and upstream of gaging spindle 12 and thus the energy of control jet 31 is determined by the characteristic gaged. Control jet 31 acts in opposition to control jet 30 to divert the flow from power jet 22 proportionately between discharge passages 23 and 24 so that the flow in each is reflective of that characteristic.

In the illustrated embodiment air from discharge passage 24 enters a line 32 to one end of signal or flow indicating means illustrated as a transparent tube 33 having a uniform internal taper. An indicating float 34 is visible through transparent tube 33 and cooperates therewith in response to the flow through the tube as determined by the gaged product characteristic. An adjustable relief 35 is provided at the opposite end of tube 33 and vents flow through the tube to atmosphere. Relief 35 is used to set the position of float 34 in tube 33 in initial calibration. A scale 36 is used in conjunction with tube 33 and float 34 to give a direct indication of flow and hence the product characteristic or diameter in this application.

An adjustable relief 43 is shown installed in line 32 for use in some applications where it may be desired to reduce flow through tapered tube 33. Relief 43 adds to the versatility of a given system making possible the use of a given signal means over large ranges.

Another adjustable restrictor 44 is included in line 45 connected to discharge passage 23. This restrictor may be used to provide a controlled resistance to flow, so that if desired, another signal means such as a device 46 installed in line 45 and of the type disclosed in U.S. Patent 2,960,774, may be also controlled accurately. Device 46 includes bellows which communicate with line 45 and flex in accordance with the pressure in this line as adjusted by restrictor 44 to give an electrical output signal through actuation of electric switches at predetermined levels. When device 46 is used in combination with tube 33 a continuous indication of product characteristic may be displayed on tube 33 while device 46 may provide indication of a product characteristic on a selective basis as required, for example, in sorting or segregating parts as a function of predetermined product characteristics.

In operation it is apparent that as air flow through gaging spindle 12 increases the energy of control jet 31 is correspondingly decreased causing control jet 30 to divert more flow from power jet 22 into discharge passage 24. This increases flow through transparent tube 33 causing float 34 to rise and indicate a large size hole in workpiece 16. If the hole in workpiece 16 is comparatively smaller, less air flows out of spindle 12 thereby increasing flow through control jet 31 to divert more air from power jet 22 into discharge passage 23 and correspondingly less than passage 24. This would result in less flow in tube 33 and the float would give a lower reading than previously described.

It will be noted that amplification of response of float 34 to workpiece clearances is obtained both through amplifier 20 and the internal taper of tube 33 thus making the device capable of a wide range of amplifications and capable of extremely high amplifications. While flow through the gaging orifices of spindle 12 will not necessarily vary linearly with changes in workpiece clearance, or diameter in this instance, there will be a characteristic curve of response. Through adjustments 40 and 41 amplifier 20 can be adjusted so that it not only provides amplified flow changes in discharge passages 23 and 24 but also acts in a compensating manner so that these flow changes are either linearly responsive to workpiece clearance changes or are of greatly improved linearity over prior known gaging systems employing a fluid medium. This makes possible utilization of a single tube 33 of straight internal taper or of minor internal development throughout an extremely wide range of gaging amplifications previously requiring a number of tubes of different degrees of internal taper for increments of this range, each being of complex internal development for linear response. For example, through the present invention it is possible to use a single indicating tube through a range of amplifications 2000–1 to 100,000–1.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gaging device for measuring a product characteristic comprising, fluid pressure supply means providing a source of fluid through a common duct, gaging means for operative association with a product to be gaged and controlling fluid flow to atmosphere which varies in accordance with the characteristic gaged, gaging passage means operatively connecting said common duct to said gaging means, a restrictor in said gaging passage means, a fluid control device having no moving operating parts comprising, a power jet of high energy flow operatively connected to said common duct, first and second discharge passages arranged opposite said power jet to receive flow therefrom, and first and second control jets of relatively low energy flow opposing one another transverse said power jet for proportioned diversion of the flow therefrom into said discharge passages in accordance with the relative flow through said control jets, passage means connecting said first control jet to said common duct, passage means connecting said second control jet to said gaging passage means downstream of said restrictor and upstream of said gaging means for control of flow through said second control jet in accordance with the flow through said gaging means and proportionate diversion of flow from said power jet into said discharge passages in accordance with the characteristic gaged, whereby flow conditions are obtained in said discharge passages as determined by the flow to atmosphere through said gaging means and amplified relative thereto, control means for said restrictor for changing the basic flow level in said gaging passage means and to said second control jet providing amplification adjustment for said gaging device, and signal means operatively connected to one of said discharge passages responsive to the flow therethrough to ambient atmosphere and to the gaged product characteristic.

2. A gaging device for measuring a product characteristic comprising, fluid pressure supply means providing a source of fluid through a common duct, gaging means for operative association with a product to be gaged and controlling fluid flow to atmosphere which varies in accordance with the characteristic gaged, gaging passage means operatively connecting said common duct to said gaging means, a restrictor in said gaging passage means, a fluid control device having no moving operating parts comprising, a power jet of high energy flow operatively connected to said common duct, first and second discharge passages arranged opposite said power jet to receive flow therefrom, and first and second control jets of relatively low energy flow opposing one another transverse said power jet for proportioned diversion of the flow therefrom into said discharge passages in accordance with the relative flow through said control jets, passage means connecting said first control jet to said common duct including a restrictor for controlling flow therethrough, passage means connecting said second control jet to said gaging passage means downstream of said restrictor and upstream of said gaging means for control of flow through said second control jet in opposition to flow through said first control jet in accordance with flow through said gaging means and proportionate diversion of flow from said power jet into said discharge passages in accordance with the characteristic gaged, whereby flow conditions are obtained in said discharge passages as determined by the flow to atmosphere through said gaging means and amplified relative thereto, control means for said gaging passage restrictor for changing the basic flow level in said gaging passage means and to said second control jet providing amplification adjustment for said gaging device, and flow indicating means operatively connected to one of said discharge passages responsive to the flow therethrough to ambient atmosphere and to the gaged product characteristic.

3. A gaging device for measuring a product characteristic comprising, fluid pressure supply means providing a source of fluid through a common duct, gaging means for operative association with a product to be gaged and controlling fluid flow to atmosphere which varies in accordance with the characteristic gaged, gaging passage means operatively connecting said common duct to said gaging means, a first adjustable restrictor in said gaging passage means, a fluid control device having no moving parts comprising, a power jet of high energy flow operatively connected to said common duct, first and second discharge passages arranged opposite said power jet to receive flow therefrom, and first and second control jets of relatively low energy flow opposing one another transverse said power jet for proportioned diversion of the flow therefrom into said discharge passages in accordance with the relative flow through said control jets, passage means connecting said first control jet to said common duct including a second adjustable restrictor for controlling flow therethrough to balance the gaging signal and provide a signal of improved linearity, passage means connecting said second control jet to said gaging passage means downstream of said first restrictor and upstream of said gaging means for control of flow through said second control jet in opposition to flow through said first control jet in accordance with flow through said gaging means and proportionate diversion of flow from said power jet into said discharge passages in accordance with the characteristic gaged, whereby flow conditions are obtained in said discharge passages as determined by the flow to atmosphere through said gaging means and amplified relative thereto, control means for said first restrictor for changing the basic flow level in said gaging passage means and to said second control jet providing amplification adjustment for said gaging devices, a transparent indicating tube having an internal taper and operatively connected at its lower end to one of said discharge passages for receiving flow therethrough and discharging to ambient atmosphere, and an indicating float visible through said transparent tube and cooperating therewith responsive to the flow therethrough and the gaged product characteristic.

4. A gaging device as set forth in claim 3 in which said first and second discharge passages each includes an adjustable relief to atmosphere.

5. A gaging device as set forth in claim 3 further comprising signal means connected to the other of said discharge passages.

6. A gaging device as set forth in claim 3 in which an adjustable relief to atmosphere is connected to the upper end of said indicating tube.

References Cited by the Examiner

UNITED STATES PATENTS

| | | |
|---|---|---|
| 2,706,397 | 4/1955 | Byrkett _____ 73—37.5 |
| 2,806,370 | 9/1957 | Emmons _____ 73—37.5 |
| 3,122,165 | 2/1964 | Horton. |
| 3,148,691 | 9/1964 | Greenblott _____ 137—81.5 |

FOREIGN PATENTS 442,365    2/1936    Great Britain.

LOUIS R. PRINCE, *Primary Examiner.*

ISAAC LISANN, *Examiner.*

FRANK H. THOMSON, *Assistant Examiner.*